United States Patent
Price et al.

(10) Patent No.: US 12,511,144 B2
(45) Date of Patent: Dec. 30, 2025

(54) CONCURRENT KERNEL AND USER SPACE DEBUGGING OF GUEST SOFTWARE ON A VIRTUAL MACHINE IN THE PRESENCE OF PAGE TABLE ISOLATION

(71) Applicant: Nightwing Group, LLC, Dulles, VA (US)

(72) Inventors: Gregory Price, Silver Spring, MD (US); Alex Grundwerg, Baltimore, MD (US)

(73) Assignee: NIGHTWING GROUP, LLC, New York, NY (US)

( * ) Notice: Subject to any disclaimer, the term of this patent is extended or adjusted under 35 U.S.C. 154(b) by 626 days.

(21) Appl. No.: 17/474,527

(22) Filed: Sep. 14, 2021

(65) Prior Publication Data

US 2022/0100549 A1    Mar. 31, 2022

Related U.S. Application Data

(60) Provisional application No. 63/083,149, filed on Sep. 25, 2020.

(51) Int. Cl.
| | |
|---|---|
| G06F 9/455 | (2018.01) |
| G06F 9/46 | (2006.01) |
| G06F 11/362 | (2025.01) |
| G06F 12/1009 | (2016.01) |

(52) U.S. Cl.
CPC .......... G06F 9/45558 (2013.01); G06F 9/461 (2013.01); G06F 11/3656 (2013.01); G06F 12/1009 (2013.01); G06F 2009/45583 (2013.01)

(58) Field of Classification Search
None
See application file for complete search history.

(56) References Cited

U.S. PATENT DOCUMENTS

| | | | |
|---|---|---|---|
| 10,768,966 B1* | 9/2020 | Naenko | G06F 9/547 |
| 10,977,192 B1* | 4/2021 | Habusha | G06F 12/1027 |
| 11,010,280 B1* | 5/2021 | Stupachenko | G06F 11/3644 |
| 2009/0019458 A1* | 1/2009 | Katari | G06F 9/541 |
| | | | 719/328 |
| 2010/0138679 A1* | 6/2010 | Yoshida | G11B 19/046 |
| | | | 713/321 |
| 2011/0058440 A1* | 3/2011 | Smith | G06F 11/1441 |
| | | | 365/229 |
| 2013/0013603 A1* | 1/2013 | Parker | G06F 16/353 |
| | | | 707/E17.046 |
| 2014/0297780 A1* | 10/2014 | Zhou | H04L 67/5681 |
| | | | 709/216 |
| 2018/0060574 A1* | 3/2018 | White | G06F 21/53 |
| 2018/0232248 A1* | 8/2018 | Tal | H04L 43/00 |
| 2020/0050783 A1* | 2/2020 | Yamada | G06F 21/6218 |

* cited by examiner

*Primary Examiner* — Wynuel S Aquino
(74) *Attorney, Agent, or Firm* — Cowan, Liebowitz & Latman, P.C.; Mark Montague

(57) ABSTRACT

A method for use in a computing device, the method comprising: transmitting, to a context manager, a context request associated with a process that is executed in a virtual machine; receiving, from the context manager, a context identifier in response to the context request; transmitting, to an introspection Application Programming Interface (API), a memory access request that is based, at least in part, on the context identifier.

24 Claims, 6 Drawing Sheets

| 134 | |
|---|---|
| PROCESS_ID | CONTEXT IDENTIFIER |
| 204  ID_1 | CONTEXT_IDENTIFIER_1  206 ⟶ 202A |
| 204  ID_2 | CONTEXT_IDENTIFIER_2  206 ⟶ 202B |
| 204  ID_3 | CONTEXT_IDENTIFIER_3  206 ⟶ 202C |

CONCURRENT KERNEL AND USER SPACE DEBUGGING OF GUEST SOFTWARE ON A VIRTUAL MACHINE IN THE PRESENCE OF PAGE TABLE ISOLATION

CROSS-REFERENCE TO RELATED APPLICATIONS

The present application claims the benefit of U.S. Provisional Patent Application No. 63/083,149, entitled "Concurrent Kernel And User Space Debugging Of Guest Software On A Virtual Machine In The Presence Of Page Table Isolation" and filed on Sep. 25, 2020, the entirety of which are hereby incorporated by reference.

BACKGROUND

Program replay/record is an effective technique for debugging of software. When program record/replay is used, a live execution of the computer program is recorded to produce a trace log identifying one or more branches that were taken during the live execution. The live execution of the program then is repeated in what is herein referred to as "replay execution," by using the same set of events and/or inputs were used as a basis for the live execution. As a result of the replay execution, a second trace log is generated, which is herein referred to as "replay execution trace log." The replay execution trace log may be used to identify defects in the software that is being debugged.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the disclosure.

A method for use in a computing device, the method comprising: transmitting, to a context manager, a context request associated with a process that is executed in a virtual machine; receiving, from the context manager, a context identifier in response to the context request; transmitting, to an introspection Application Programming Interface (API), a memory access request that is based, at least in part, on the context identifier.

According to aspects of the disclosure, a system is provided, comprising: a memory; and at least one processor that is operatively coupled to the memory, the at least one processor being configured to perform the operations of: transmitting, to a context manager, a context request associated with a process that is executed in a virtual machine; receiving, from the context manager, a context identifier in response to the context request; transmitting, to an introspection Application Programming Interface (API), a memory access request that is based, at least in part, on the context identifier.

According to aspects of the disclosure, a non-transitory computer-readable medium is provided that stores one or more processor executable instructions, which, when executed by at least one processor, cause the at least one processor to perform the operations of: transmitting, to a context manager, a context request associated with a process that is executed in a virtual machine; receiving, from the context manager, a context identifier in response to the context request; transmitting, to an introspection Application Programming Interface (API), a memory access request that is based, at least in part, on the context identifier.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

In one aspect of the disclosure, techniques are provided for accessing memory across memory contexts of a virtual machine. The technique may be used to allow a debugger to resolve memory access requests into the memory context of a virtual machine, irrespective of whether that machine is executing in a particular memory context.

Figure 1:
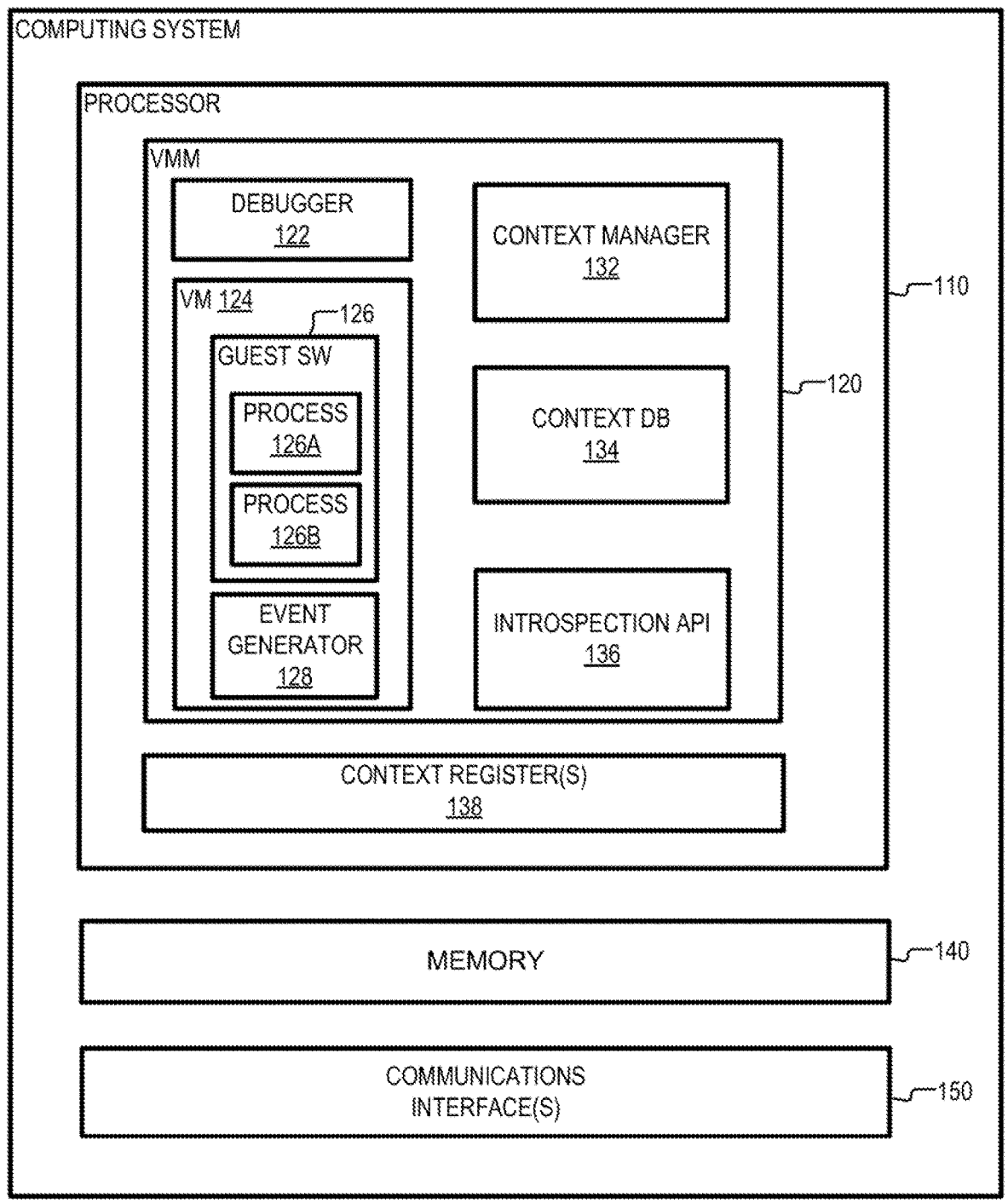
FIG. 1 is a diagram of an example of a computing system, according to aspects of the disclosure.

FIG. 1A is a schematic diagram of a computing system 100, according to aspects of the disclosure. As illustrated, the computing system 100 may include a processor 110 that is operatively coupled to a memory 140, and communications interface(s) 150. The processor 110 may include any suitable type of processing circuitry, such as one or more of an integrated circuit (ASIC), a field-programmable gate array (FPGA), and/or a general-purpose processor (e.g., an ARM-based processor, an x86 processor, etc.). The memory 140 may include any suitable type of volatile and/or non-volatile memory. For example, in some implementations, the memory 140 may include one or more of random-access memory (RAM), a read-only memory (ROM), a solid-state drive (SSD), electrically erasable programmable read-only memory (EEPROM), and/or any other suitable type of memory. The communications interface(s) 150 may include a Bluetooth interface, a Wi-Fi interface, a ZigBee interface, a Universal Serial Bus (USB) interface, and/or any other suitable type of interface.

According to the present example, the processor 110 includes a single core. However, alternative implementations are possible in which the processor 110 includes more than one core. As illustrated, the processor 110 may include one or more context registers 138. The context registers 138 may include any register that identifies the current context of the processor 110. For example, the context registers 138 may include a register that identifies what process is currently running on the processor 110, a register that identifies the memory space (e.g., a page table) corresponding to the process, etc. An example of a context register in the x86 architecture is the CR3 register, which enables the processor to translate linear addresses into physical addresses by locating the page directory or page tables for the current context of the processor. In some implementations, the process 110 may be configured to execute methods 500, 600A, 600B, and 700, which are discussed further below with respect to FIGS. 5, 6A, 6B, and 7, respectively.

The processor 110 may be configured to execute a virtual machine manager (VMM) 120. The VMM 120 may include any suitable type of hypervisor. The VMM 120 may be configured to execute a debugger 122, a context manager 132, an introspection API 136, and a context database 134. The VM 124 may be configured to execute a guest software 126 and an event generator 128. The guest software, according to the present example, is an operating system. The guest software 126 may be configured to execute a process 126A and a process 126B. The debugger 122 may include any suitable type of debugger that is configured to debug the execution of VM 124 and/or any software that is executing within VM 124, such as the guest software 126, the process 126A, the process 126B, etc.

The event generator 128 may include any suitable type of API that is configured to generate system events when a new process is instantiated within VM 124 and/or the guest software 126 or when an already-instantiated process changes states. As is discussed further below, the system events may be utilized by the context manager 132 to detect when a new process (e.g., a task, a thread, an operating system process, etc.) is instantiated by VM 124 and/or obtain context data relating to the context of the new process. Additionally or alternatively, the system events may be utilized by the context manager 132 to detect when new memory contexts are instantiated by the VM 124 and/or obtain context data relating to the new memory contexts. According to the example of FIG. 1, the event generator 128 is provided by VM 124. However, alternative implementations are possible in which the event generator 128 is provided by VMM 120 and/or any other suitable type of component of the computing system 100.

The context manager 132 may be configured to monitor system events that are generated by event generator 128 and update the context database 134. Furthermore, the context manager 132 may be configured to provide a particular memory context of the VM 124 (e.g., the context of one of processes 126A or 126B, etc.) According to the example of FIG. 1, the context manager 132 is provided by VMM 120. However, alternative implementations are possible in which the context manager 132 is provided by VM 124 and/or any other suitable type of component of the computing system 100. Furthermore, it will be understood that in some implementations, the context manager 132 may be executed outside of VMM 120. Stated succinctly, the present disclosure is not limited to any specific implementation of the context manager 132.

The context database 134 may include one or more data structures that are arranged to store context information for memory contexts of the VM 124. Although in the example of FIG. 1 the context database 134 is provided by VMM 120, alternative implementations are possible in which the context database 134 is provided by VM 124 or provided independently of VMM 120. Stated succinctly, the present disclosure is not limited to any specific implementation of the context database 134.

The introspection API 136 may include an application programming interface (API) for reading data from or writing memory to the memory 140. Although in the example of FIG. 1 the introspection API 136 is provided by VMM 120, alternative implementations are possible in which the context database 134 is provided by VM 124 or provided independently of VMM 120. Stated succinctly, the present disclosure is not limited to any specific implementation of the introspection API 136.

The context manager 132 may be configured to monitor system events generated by the event generator 128 and update the context database 134 based on the events. An example of the context database 134 is shown in FIG. 2.

Figures 2, 3:
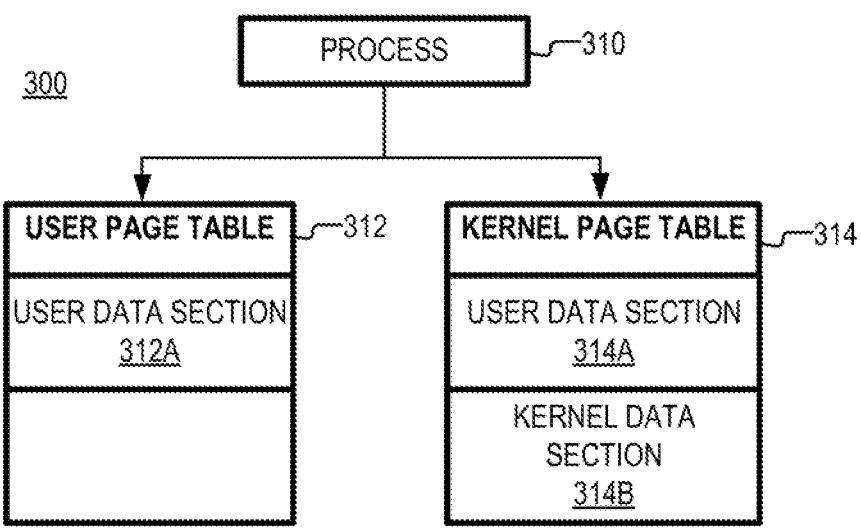
FIG. 2 is diagram of an example of a context database, according to aspects of the disclosure.
FIG. 3 is a diagram of an example of a set of page tables that are associated with a process, according to aspects of the disclosure.

FIG. 2 shows the context database 134 in further detail. As illustrated, the context database 134 may include a plurality of entries 202. Each entry 202 may include a process identifier 204 and a context identifier 206 that corresponds to the process identifier. The process identifier 204 may correspond to a process or a portion of a process that is associated with a particular memory context. In some implementations, a process may be associated with a single memory context. In other implementations, different parts of a process may be associated with different memory contexts.

According to the example of FIG. 2, the context database 134 includes three entries (i.e., entries 202A-C), however it will be understood that the context database 134 may include any number of entries. Entry 202A may include an identifier 204 of a first process and a context identifier corresponding to the first process; entry 202B may include an identifier 204 of a second process and a context identifier 206 corresponding to the second process; and entry 202C may include an identifier 204 of a third process and a context identifier 206 corresponding to the third process.

As used throughout the disclosure, the term context identifier corresponding to a process may refer to any suitable type of object, number, or alphanumerical string or set of objects, numbers, or alphanumerical strings that identifies context information associated with the process. For example, the context identifier of a process may include a pointer to a user page table of the process. As another example, the context identifier of a process may include one or more of a pointer to a user page table of the process, a pointer to a kernel page table of the process, a current privilege level (CPL) of the process, a name of the process, an identifier corresponding to the process, and/or any other information that is defined by VM 124 and/or guest software 126 that defines the unique system state of the process. As yet another example, the context identifier may include a context object that includes one or more of a pointer to a user page table of the process, a pointer to a kernel page table of the process, a current privilege level (CPL) of the process, a name of the process, an identifier corresponding to the process, and/or any other information that is defined by VM 124 and/or guest software 126 that defines the unique system state of the process. Although FIG. 2 depicts each entry 202 as including a single piece of information (e.g., a single context identifier 206), it will be understood that in some implementations are possible in which any of the entries 202 includes multiple pieces of information (e.g., multiple context identifies, etc.).

FIG. 3 is a diagram illustrating a set 300 of page tables that are associated with a process 310. The process 310 may be the same or similar to any of process 126A and process 126B. As illustrated, the set 300 may include a user page table 312 that is associated with the process 310 and a kernel page table 314. The user page table 312 may include a user data section 312A. The user data section 312A may identify one or more memory locations where data that is used for the execution of the process 310, or data generated by process 310, is stored. The kernel page table 314 may include a user data section 314A and a kernel data section 314B. The user data section 314A may be the same or similar to the user data section 312B. The kernel data section may identify locations where one or more objects (generated by the operating system) are stored, which describe the current state of the process 310. By way of example, such objects may identify: whether the process 310 is currently suspended or running, a queue where the process 310 waiting, and/or any other suitable aspects of the execution of the process 310. Although in the example of FIG. 3, the kernel page table 314 includes both a user data section and a kernel data section, alternative implementations are possible in which the kernel page table 314 includes only a kernel data section.

Figure 4:
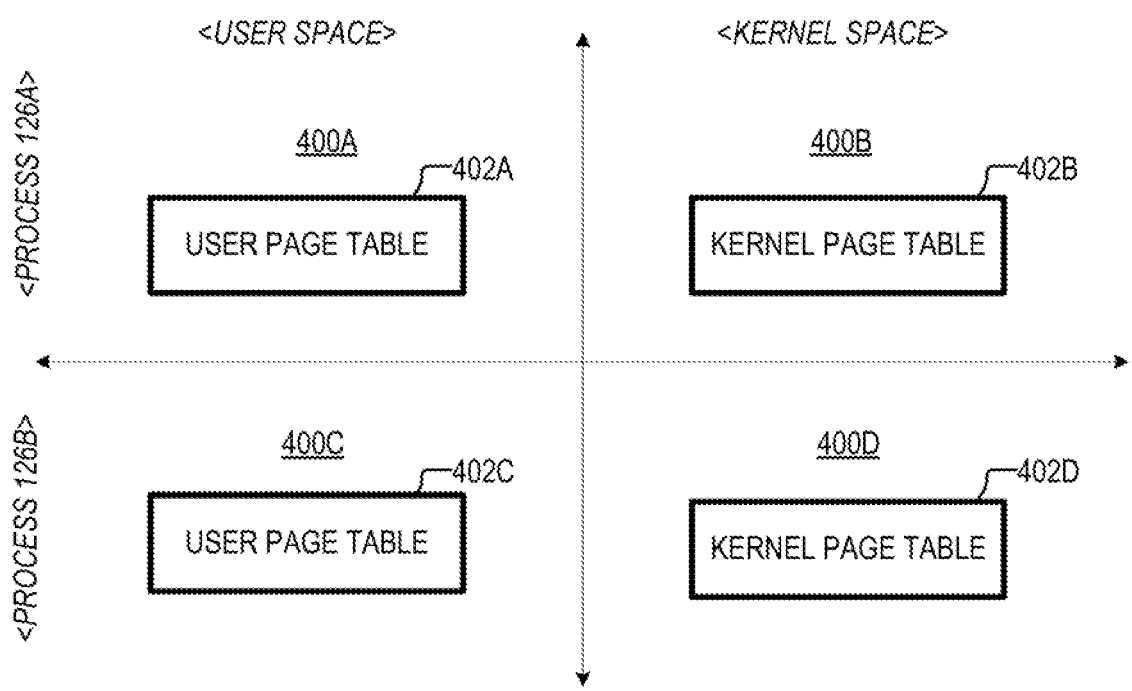
FIG. 4 is a diagram of an example of different contexts of a virtual machine, according to aspects of the disclosure.

FIG. 4 is a diagram illustrating the respective contexts of the processes 126A and 126B. As illustrated, the process 126A may have a user space context 400A and a kernel space context 400B. The user space context 400A of the process 126A may include a user page table 402A of the process 126A. The kernel space context 400B of the process 126A may include a kernel page table 402B of the process 126B. The process 126B may have a user space context 400C and a kernel space context 400D. The user space context 400C of the process 126B may include a user page table 402C of the process 126B. The kernel space context 400D of the process 126D may include a kernel page table 402D of the process 126D.

Figure 5:
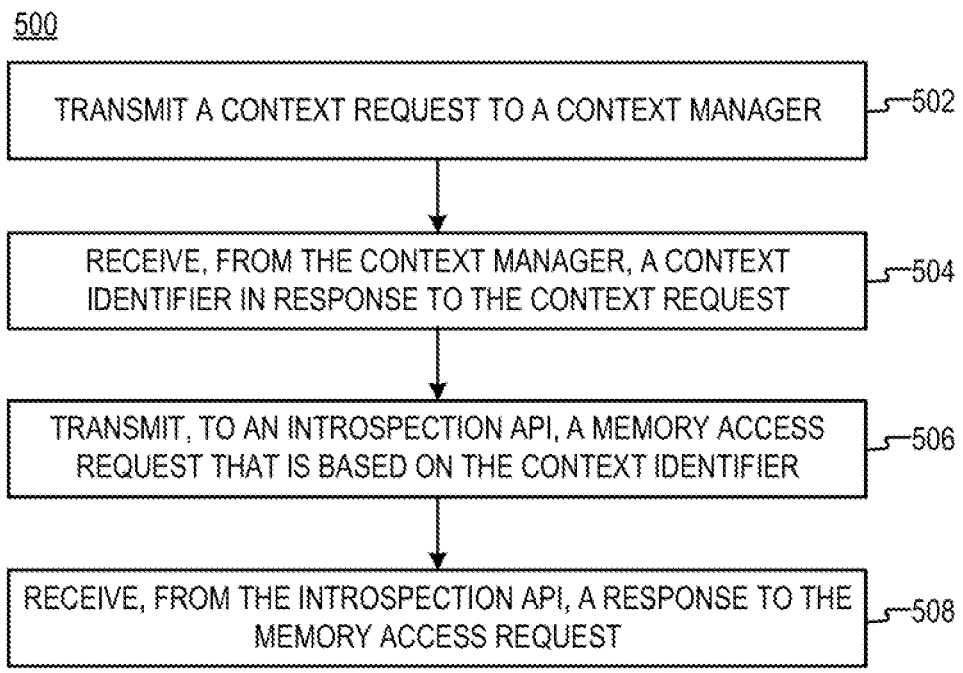
FIG. 5 is a flowchart of an example of a method, according to aspects of the disclosure.

FIG. 5 is a flowchart of an example of a method 500, according to aspects of the disclosure. At step 502, the debugger 122 transmits a context request to the context manager 132. The context request may include an identifier corresponding to a process from whose memory space (e.g., from whose context or page table, etc.) the debugger 122 wants to retrieve data. The identifier may include a process ID (PID) and/or any other suitable type of number, string, or alphanumerical string that identifies the process, either implicitly or explicitly. At step 504, the debugger 122 receives a context identifier in response to the request. At step 506, the debugger 122 transmits to the context manager 132 a memory access request. In some implementations, the memory access request may include the context identifier that is received at step 506. Additionally or alternatively, the request may include an indication of a memory address (e.g., an offset) and an indication of data length. The memory access request may include one of a memory read request or a memory write request. At step 508, the debugger 122 receives, from the introspection API 136, a response to the request. When the memory access request is a memory read request, the response may include data that is retrieved in response to the memory read request. When the memory access request is a memory write request, the response may include an acknowledgment that the write has been completed successfully.

Figure 6B:
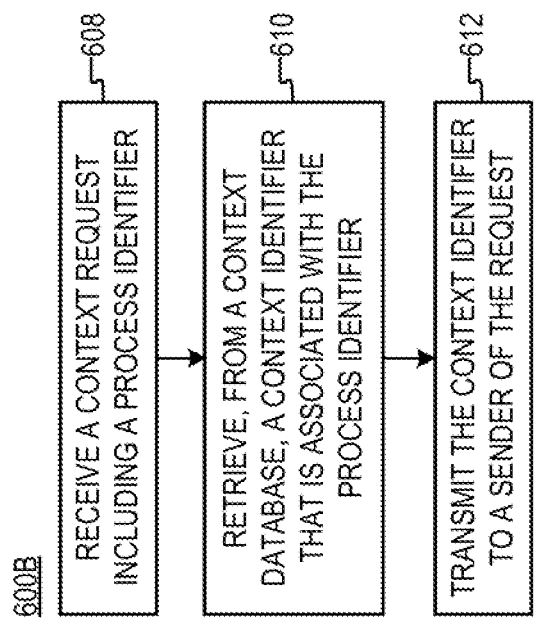
FIG. 6B is a flowchart of an example of a method, according to aspects of the disclosure.
Figure 6A:
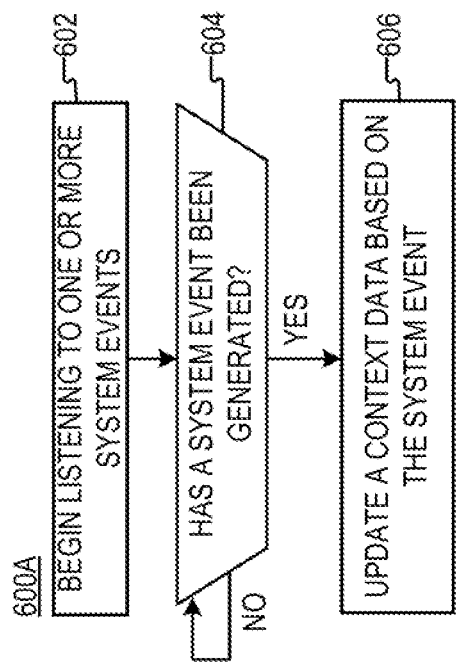
FIG. 6A is a flowchart of an example of a method, according to aspects of the disclosure.

FIG. 6A is a flowchart of an example of a method 600A, according to aspects of the disclosure. At step 602, the context manager 132 begins listening for one or more system events. The system events may include a system event that is generated when a new process is instantiated by VM 124. Additionally or alternatively, the system events may include a system event that is generated when VM 124 transitions from one memory context into another. In some implementations, the VM 124 may be considered to have transitioned from one memory context to another when the value of a page table base pointer that is used at least in part by the VM 124 is changed and/or when the state of a process executed by the VM 124 changes states (e.g., by becoming suspended, running, or terminated, etc.). At step 604, the context manager 132 detects whether any of the system events have been generated. If any of the system events is detected, the method 600A proceeds to step 604. Otherwise, if no system events are detected, step 604 is repeated. At step 606, the context manager updates the context database 134 based on the detected system event. For example, if the detected system event is one that is generated when a new process has been instantiated by VM 124, the context manager 132 may add a new entry 202 to the context database 134 that corresponds to the new process. As discussed above the new entry may include a process identifier for the new process, as well as a context identifier corresponding to the process. As another example, if the detected event indicates that a process has transitioned from one state into another, the context manager 132 may identify an entry 202 in the context database 134 that corresponds to the process and update the identified entry 202 to identify the new state of the process. In some implementations, the context database 124 may be updated to include data that is provided by the event.

FIG. 6B is a flowchart of an example of a method 600B, according to aspects of the disclosure. At step 608, the context manager 132 receives, from the debugger 122, a context request. As noted above, the context request may include a process identifier. At step 610, the context manager 132 retrieves, from the context database 134, an entry 202 that includes a process identifier 204, which matches the process identifier received with the context request. At step 612, the context manager 132 obtains a context identifier from (or otherwise based on) the entry (retrieved at step 610) and transmits the entry to the debugger 122.

Figure 7:
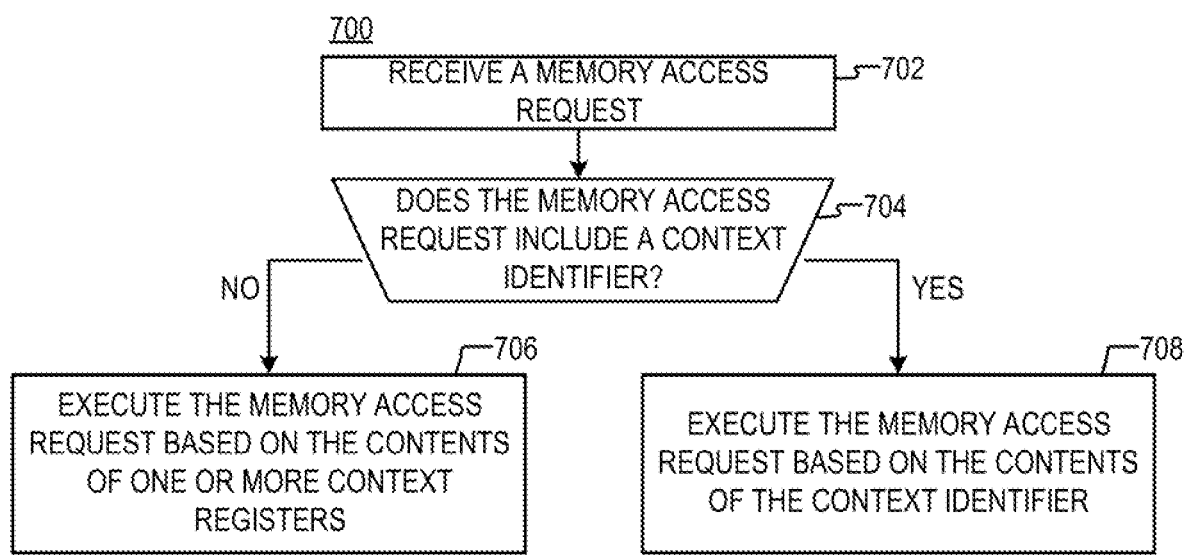
FIG. 7 is a flowchart of an example of a method, according to aspects of the disclosure.

FIG. 7 is a flowchart of an example of a method 700, according to aspects of the disclosure. At step 702, the introspection API 136 receives a memory access request from the debugger 122. The memory access request may include a read request or a write request. The memory access request may include indication of an address (e.g., an offset). Furthermore, when the memory access request is a read request, it may also include and an indication of a length of data that is desired to be retrieved from the address. Also, the memory access request may or may not include a context identifier. For example, the received memory access request may be the same or similar to the one sent at step 506 of the process 500.

At step 704, the introspection API determines if the memory access request includes a context identifier. Determining whether the memory access request includes a context identifier may include one or more of: (i) examining the contents of the memory access request to detect whether it includes a content identifier, (ii) detecting whether the memory access request is of a type that is expected to include (or otherwise be associated with) a context identifier, and/or any other action that helps the introspection API whether other data should be used to complete the memory access request instead of the contents of one or more context registers. If the memory access request includes a context identifier, the method 700 proceeds to step 708. If the memory access request does not include a context identifier, the method 700 proceeds to step 706.

At step 706, the memory access request executes the memory access request based on information that is stored one or more context registers. An example of a context register is the CR3 register in the x86 architecture. However, the present disclosure is not limited to any specific type of context register, as the processor architectures on which any of the methods 500, 600A, 600B, and 700 is executed may vary. As noted above, the memory access request may include a read request or a write request. Executing the memory access request based on information that is stored one or more context registers may include: (1) retrieving a base pointer to a page table from a register (e.g., CR3), (2) adding an offset provided in the memory access request to the base pointer to obtain a memory address where the requested data is stored, (3) retrieving data from or writing data to the memory address. When the memory access request is a read request, any retrieved data may be provided to a sender of the memory read request. At step 708, the introspection API executes the memory access request based on the context identifier (e.g., based on a base pointer to a page table that is contained in the context identifier, etc.). Executing the memory access request based on the context identifier may include: (1) obtaining, based on the context identifier, a base pointer to a page table, (2) adding an offset provided in the memory access request to the base pointer to obtain a memory address where the relevant data is stored, (3) retrieving data from or writing data to the memory address. When the memory access request is a read request, any retrieved data may be provided to a sender of the memory read request. As noted above, the context identifier may include a base pointer of a user or kernel page table that is outside of the context of the sender of the memory access request (e.g., the debugger 122). In some respects, at step 708, the introspection API 136 effectively overrides the contents of the context registers of the processor 110 with information that is contained in the context identifier to reach outside of the current context of the processor 110. The processor 110, in this example, is a single processing core, and as such, it cannot be, at the same time, in both of: (i) the context of the sender of the memory access request, and (ii) the context to which the memory access request is directed. Debugging the VM 124 (including software executing in the VM) may require the debugger 122 to perform memory accesses outside of the VM's 124 present context, and the introspection API 136 facilitates the performance of such memory accesses.

FIGS. 1-7 are provided as an example only. At least some of the steps discussed with respect to FIGS. 1-7 may be performed in parallel, in a different order, or altogether omitted. As used in this application, the word "exemplary" is used herein to mean serving as an example, instance, or illustration. As used throughout the disclosure, the term "context identifier" shall refer to any number, string, or alphanumerical string that implicitly or explicitly identifies a process or other memory context. As used throughout the disclosure, the term "process" or "task" shall refer to a sequence of computer instructions that is scheduled independently by a scheduler, such as an operating system scheduler, a virtual machine scheduler, a hypervisor scheduler, and/or any other type of scheduler. As used throughout the disclosure, the term "memory context" shall refer to any Operating System construct, a virtual machine construct, and/or any other construct which creates a virtual address mapping for some physical address space. Without limitation, examples of such constructs may include a base pointer to a page table that is stored in a particular register (e.g. CR3), the page table itself, or a portion of the page table. As noted above, in some implementations, a process may be associated with multiple memory contexts.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a computing device having a processor executing computer instructions that cause the processor to operate steps comprising:
    operating a virtual machine debugger as a separate process on a virtual machine;
    operating a context manager, configured to monitor one or more system events that are generated in the virtual machine, and configured to update and store in a context database a context identifying data corresponding to a specific process when at least one system event is detected by the context manager,
    receiving from the debugger by the context manager, a context request associated with a process that is executed by a computer processor on a virtual machine at a specific time;
    retrieving by the context manager from the context database a context identifier that corresponds to the transmitted context request, wherein said context identifier comprises a pointer to at least one user page table and at least one kernel page table that is allocated to the process associated with the context identifier, information that defines a unique state of said process, and identifies whether the process is suspended or running at the specific time;
    transmitting, to an introspection Application Programming Interface (API), a computer memory access request that is based, at least in part, on the context identifier retrieved from the context database; and
    accessing the computer memory where relevant data is stored after evaluation of the access request and the context identifier transmitted to the API.

2. The method of claim 1, wherein the memory access request includes a memory read request, the method further comprising receiving, from the introspection API, data that is retrieved from a memory that is allocated to the process, the data being retrieved from the introspection API based on the context identifier in response to the memory read request.

3. The method of claim 1, wherein the context database updated by the context manager comprises a plurality of entries, each entry identifying a respective page table of a corresponding process.

4. The method of claim 1, wherein the context identifier includes a pointer to a page table that is associated with the process, such that requests may be constructed to access memory across contexts.

5. The method of claim 1, wherein the context identifier includes a context object comprising a process identifier.

6. The method of claim 1, wherein the context request and the memory access request are transmitted by software that is configured to debug, run, or analyze the virtual machine, the software and the virtual machine being executed inside a virtual machine manager.

7. The method of claim 1, wherein the introspection API is configured to use, at least a portion of the context identifier in lieu of information stored in one or more context registers of the computing device.

8. The method of claim 1, wherein the detected system event comprises (a) an event that is generated when a new process is initiated by the virtual machine; or (b) an event that is generated when a process executing on the virtual machine transitions from one memory context to another.

9. The method of claim 1, wherein the context identifier, retrieved by the context manager from the context database, transmitting, to an introspection Application Programming Interface (API), a computer memory access request that is based, at least in part, on the context identifier retrieved from the context database, wherein the computer memory associated with the retrieved context identifier is different from a current memory state and different from the memory accessible by the debugger.

10. A system, comprising:
    a memory; and
    at least one processor that is operatively coupled to the memory, the at least one processor executing computer instructions that cause the processor to perform the operations of:
    operating a virtual machine debugger as a separate process on the virtual machine;
    operating a context manager, configured to monitor one or more system events that are generated in the virtual machine, and configured to update and store in a context database a context identifying data corresponding to a specific process when at least one system event is detected by the context manager;
    receiving from the debugger, by a context manager, a context request associated with a process that is executed in by a computer processor on a virtual machine at a specific time;
    retrieving by the context manager from the context database a context identifier that corresponds to the transmitted context request, wherein said context identifier comprises a pointer to at least one user page table and at least one kernel page table that is allocated to the process associated with the context identifier, information that defines a unique state of said process, and identifies whether the process is suspended or running at the specific time;

transmitting, to an introspection Application Programming Interface (API), a computer memory access request that is based, at least in part, on the context identifier retrieved from the context database; and accessing the computer memory where relevant data is stored after evaluation of the access request and the context identifier transmitted to the API.

11. The system of claim 10, wherein the memory access request includes a memory read request, the method further comprising receiving, from the introspection API, data that is retrieved from a memory that is allocated to the process, the data being retrieved from the introspection API based on the context identifier in response to the memory read request.

12. The system of claim 10, wherein the context database updated by the context manager comprises a plurality of entries, each entry identifying a respective page table of a corresponding process.

13. The system of claim 10, wherein the context identifier includes a pointer to a page table that is associated with the process, such that requests may be constructed to access memory across contexts.

14. The system of claim 10, wherein the context identifier includes a context object comprising a process identifier.

15. The system of claim 10, wherein the context request and the access request are transmitted by software that is configured to debug, run, or analyze the virtual machine, the software and the virtual machine being executed inside a virtual machine manager.

16. The system of claim 10, wherein the introspection API is configured to use, at least a portion of the context identifier in lieu of information stored in one or more context registers of the computing device.

17. The system of claim 10, wherein the detected system event comprises (a) an event that is generated when a new process is initiated by the virtual machine; or (b) an event that is generated when a process executing on the virtual machine transitions from one memory context to another.

18. The system of claim 10, wherein the at least one processor executes computer instructions that further cause the processor to retrieve by the context manager from the context database the context identifier that is different from a current memory state and different from the memory accessible by the debugger.

19. A non-transitory computer-readable medium storing one or more processor executable instructions, which, when executed by at least one processor, cause the at least one processor to perform the operations of:

operating a virtual machine debugger as a separate process on the virtual machine;

operating a context manager, configured to monitor one or more system events that are generated in the virtual machine, and configured to update and store in a context database a context identifying data corresponding to a specific process when at least one system event is detected by the context manager;

receiving from the debugger by a context manager, a context request associated with a process that is executed in by a computer processor on a virtual machine at a specific time;

retrieving by the context manager from the context database a context identifier that corresponds to the transmitted context request, wherein said context identifier comprises a pointer to at least one user page table and at least one kernel page table that is allocated to the process associated with the context identifier, information that defines a unique state of said process, and identifies whether the process is suspended or running at the specific time;

transmitting, to an introspection Application Programming Interface (API), a computer memory access request that is based, at least in part, on the context identifier retrieved from the context database; and accessing the computer memory where relevant data is stored after evaluation of the access request and the context identifier transmitted to the API.

20. The non-transitory computer-readable medium of claim 19, wherein the memory access request includes a memory read request, the method further comprising receiving, from the introspection API, data that is retrieved from a memory that is allocated to the process, the data being retrieved from the introspection API based on the context identifier in response to the memory read request.

21. The non-transitory computer-readable medium of claim 19, wherein the context database updated by the context manager comprises a plurality of entries, each entry identifying a respective page table of a corresponding process.

22. The non-transitory computer-readable medium of claim 19, wherein the context identifier includes a pointer to a page table that is associated with the process, such that requests may be constructed to access memory across contexts.

23. The non-transitory computer-readable medium of claim 19, wherein the context identifier includes a context object comprising a process identifier.

24. The non-transitory computer-readable medium of claim 19, wherein the context request and the access request are transmitted by software that is configured to debug, run, or analyze the virtual machine, the software and the virtual machine being executed inside a virtual machine manager.

* * * * *